May 14, 1957 M. JULLIARD 2,792,185
FIXING OF FILMS ON THE SPOOLS OF PHOTOGRAPHIC
AND CINEMATOGRAPHIC APPARATUS
Filed Nov. 15, 1952 3 Sheets-Sheet 1
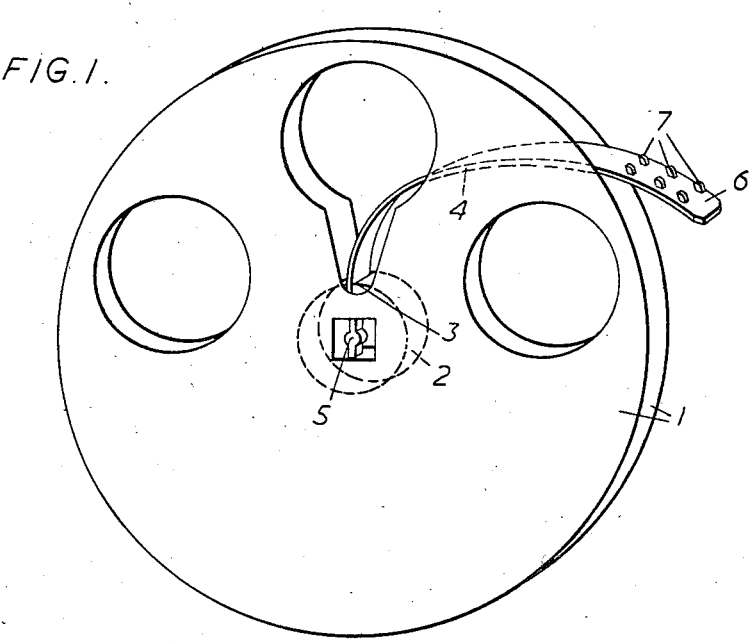
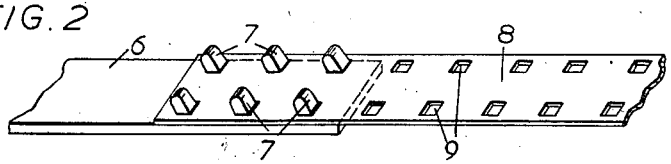
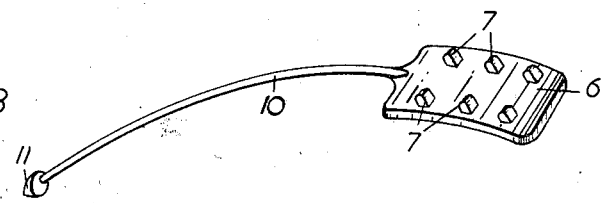
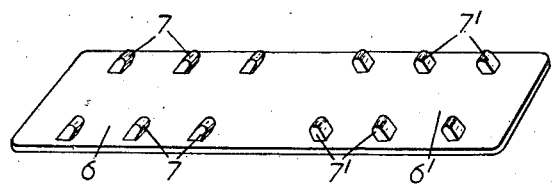
Inventor:
Maurice Julliard
By: Michael A Steirle
agt.

May 14, 1957 M. JULLIARD 2,792,185
FIXING OF FILMS ON THE SPOOLS OF PHOTOGRAPHIC
AND CINEMATOGRAPHIC APPARATUS
Filed Nov. 15, 1952 3 Sheets-Sheet 2

Inventor:
Maurice Julliard

By: Michael S. Striker
Agt.

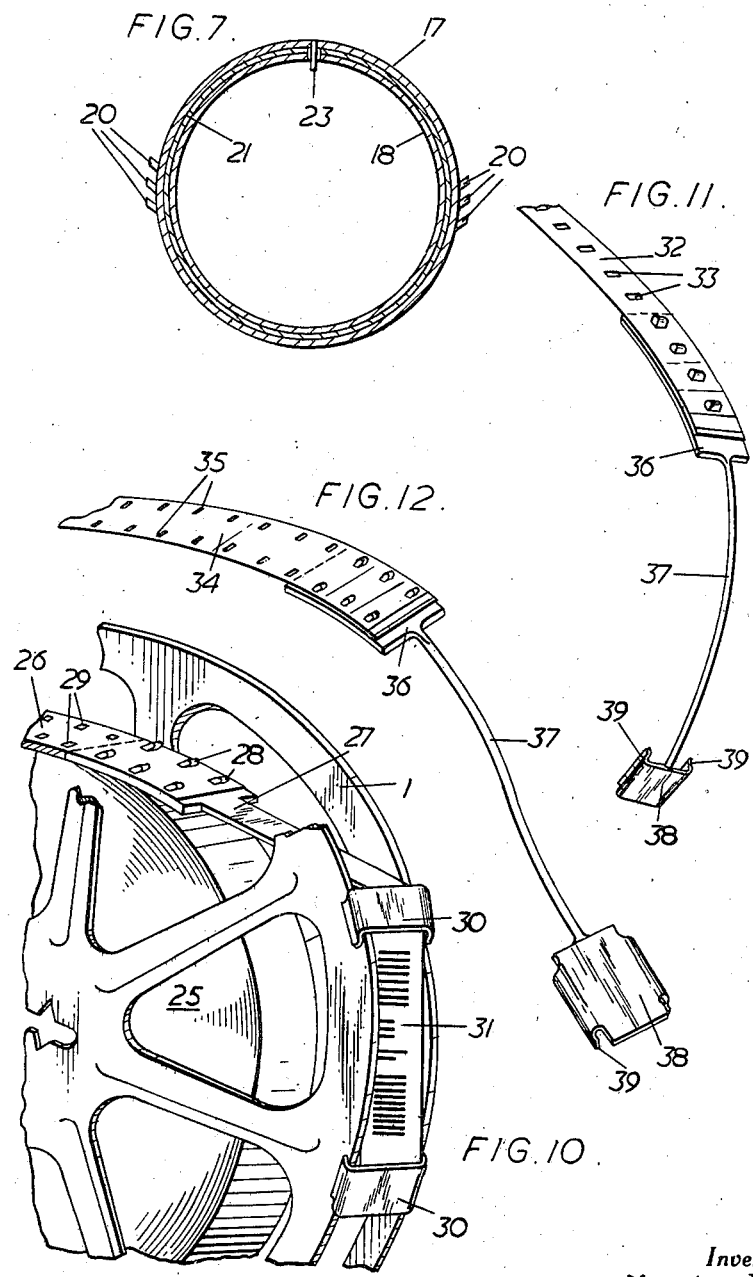

United States Patent Office 2,792,185
Patented May 14, 1957

2,792,185

FIXING OF FILMS ON THE SPOOLS OF PHOTOGRAPHIC AND CINEMATOGRAPHIC APPARATUS

Maurice Julliard, Paris, France

Application November 15, 1952, Serial No. 320,729

Claims priority, application France November 19, 1951

6 Claims. (Cl. 242—74)

This invention relates to means for securing the end of a film to the spools used in connection with photographic and cinematographic apparatus, and it has for its object improved means for securing a film to such spools.

Up to now, the fixing of the inner end of a film on a winding spool, particularly in the case of cinematographic films, has been achieved by folding back the end of the film and inserting it in a slit provided in the hub of the spool.

This procedure presents numerous drawbacks. It is difficult to insert the folded-back end of the film in the slit, particularly in the dark, and the film readily came out of the slit; besides the film became easily broken at the fold. Numerous types of clips have been proposed, all of which are more or less complicated mechanical devices requiring spools of special design.

The present invention has for its object a device doing away with all these drawbacks and capable of being fitted on any ordinary spool in existence at the present time.

In a preferred form, the device is constituted by a flexible strip the width of which is practically the same as that of the film and the total length of which is slightly greater than the radius of the spool, the inner end of this strip being adapted to be inserted into the slit of the hub of the spool and being provided with a swelling, fillet or bead so as to be wider than the width of the slit so that it cannot come out again, and the other, outer end being provided with a plurality of projections the disposition and the dimensions of which correspond to those of the perforations of the film, adapted to readily enter into the said perforations.

The projections that are situated towards the hub of the spool, that is to say, which are farthest from the outer end of the strip, are slightly oblique backwards, that is, are directed towards the inner end, so that when the film is applied against these projections, starting from the inner end, the two first ones engage readily the perforations at the end of the film and play the part of initial guides for the others which fit of themselves into the perforations following. When the film is unwinding, the perforations corresponding to the projections situated at the end of the strip come out of these perforations by themselves and begin the unfastening of the film.

According to an alternative form of the invention, yet more preferable, the strip for the fixing of the film on the hub is secured on this hub no longer by an end of the strip being inserted in the slit in the hub, but by a thin stem, preferably armored, terminated by a small sphere the diameter of which is greater than the width of the slit, this arrangement permitting to wind the film in one direction or the other in whichever direction is the face provided with the projections, whether the said sphere pivots in the hub or by torsion of the said stem through half a turn, if the stem is sufficiently thin.

The other contemplated applications are the following:
If two strips provided with projections are juxtaposed and united at their back ends, the whole may be used for joining end-on the two ends of a broken strip of film, these two ends being securely united owing to the fact that the projections at both ends are inclined in opposite directions.

One can also use the same arrangement according to the invention to secure the outer end of a film on a spool. A wound film having a tendency to unwind, it is advisable to fix the free end. The same device can then be so disposed as to carry an indication of the nature of the film wound on the spool.

Finally, in another embodiment of the invention, the portion of the strip between the hub and the projections is reduced to a minimum, that is to say that the strip is in the immediate vicinity of the hub, so that at the moment of the winding of the film, it may be considered as being placed on the surface itself of the hub. In these conditions, the strip may be made either of some flexible and resilient material wound round the hub, a claw-like element entering the slit of the hub preventing this strip from slipping on the metal of the hub, or it may be obtained in securing in any suitable manner the strip on a collar of resilient steel adopting sensibly the curvature of the hub and the slipping of which is also prevented by a claw-like member entering the slit. In this latter case, the strip or the collar may be, or may not be of the same width and their fastening may be achieved by metallic lugs gripping the strip against the collar.

In this embodiment, the projections being situated on the surface of the hub, one may provide two sets of projections directed in opposite directions, so that, whatever may be the direction in which the film may be wound, the latter becomes hooked on the hub. It has been ascertained that in this way, the projections being practically motionless on the hub, the unhooking of the film at the end of the unwinding took place instantly.

Moreover, in the case when the strip is simply wound on the hub and is constituted for example by a ribbon of plastic material, it suffices that its two ends be united by a suitable tightening means to prevent any slipping owing to its own adhesion.

Finally, in an alternative embodiment applied to the above described arrangements, the member adapted to the fixing of the external end of the film on the cheeks of the spool is provided with a hooking device comprising two lateral clips each of which is adapted to grip one of the said cheeks between its jaws.

The invention will be better understood with reference to the accompanying drawings, illustrating in the way of examples only preferred embodiments of the invention. In these drawings:

Fig. 1 represents a spool provided with the device according to the invention.

Fig. 2 represents on an enlarged scale the internal end of a film placed on the device according to the invention.

Fig. 3 represents an alternative form of this embodiment.

Fig. 4 represents the application of the invention to the uniting of two ends of a broken film.

Fig. 7 is a side view of the embodiment shown in Fig. 6, on a larger scale.

Fig. 10 represents a fourth embodiment of the invention.

Figs. 11 and 12 represent two alternative forms of the embodiment shown in Fig. 10.

Figure 5:
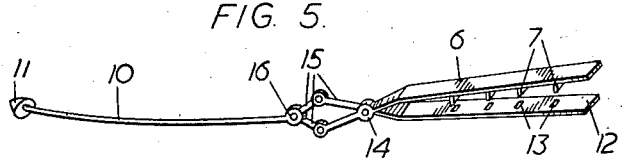
Fig. 5 represents a second embodiment of the invention.

In Fig. 1, is represented a spool of a known model for cinematographic film, comprising cheeks 1 and a hub 2 in the slit 3 of which is inserted the end of a film, according to the present practice. According to the invention, the end of a strip of a plastic material such as a synthetic resin is inserted in the said slit 3, the end of the strip comprising a swelling, fillet or bead 5 of a thickness greater than the width of the slit 3. This may be achieved either in forcing through the slit a swelling, fillet or bead on the strip 4, or by introducing a metallic pin in the median plane of the strip, transversely thereof, after it has been introduced in the slit 3.

The strip 4 comprises at its other, outer end, projections 7 inclined backwards as is better seen in Fig. 2. When the inner end of a film 8 is hooked to this device, the perforations of this film correspond to the projections 7, which cause an instantaneous hooking of the film without affecting the unhooking in any way.

According to the alternative arrangement represented in Fig. 3, the end 6 carrying the projections 7 is secured to the hub of the spool by a thin stem 10 the end of which is provided with a ball 11 the diameter of which is greater than the width of the slit 3 but nevertheless permits the ball to be squeezed through the said slit, the material of the ball being somewhat compressible. This kind of arrangement allows the film to be hooked even with the wrong side up without subsequent awkwardness, as the hooking device can turn round on itself, either simply by rotating or by torsion of the stem 10.

Referring to Fig. 4, it is seen that two strips 6 and 6' provided with projections 7, 7' inclined in opposite directions may be combined to join together two pieces of a film, for example in the case of a broken film. This simple double strip does away with the long and delicate operations of re-glueing in case of accident.

According to an alternative arrangement represented in Fig. 5, the stem 10 no longer carries a strip 6 provided with projections 7, but, in addition, a strip 12 having perforations 13, the strips 6 and 12 being hinged at 14 so that, when introducing a film between them, the projections 7 first pass through the perforations of the film then through the perforations 13, thereby providing really a locking of the film on the joining device. This locking is the more secure that the tension of the film is greater, owing to a system of levers forming a parallelogram 15, hinged to the end 16 of the stem 10.

This device for hooking the film at its inner end may be subjected to yet another modification, represented in Figs. 6 to 9.

Figure 6:
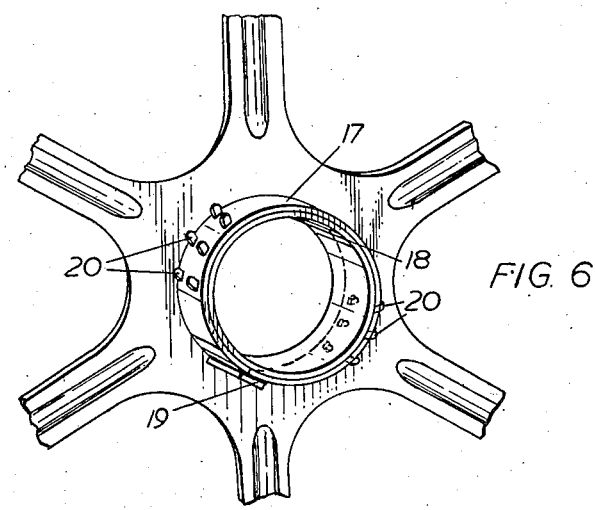
Fig. 6 represents a third embodiment of the invention.

According to the modification represented in these figures, the strip 6 carrying the projections 7 is disposed, no longer at the end of a stem or with a swelling, fillet or bead on its inner end, but directly round the hub of the spool. This is shown in Figs. 6 and 7 where is shown a strip 17 wound round the hub 18 of a spool. This strip 17 (Fig. 6) is simply wound on the hub 18 and tightened round it by a hooking device 19. It bears projections 20 directed in opposite directions so as to allow the hooking of the film whatever may be the position of the spool.

Figure 8:
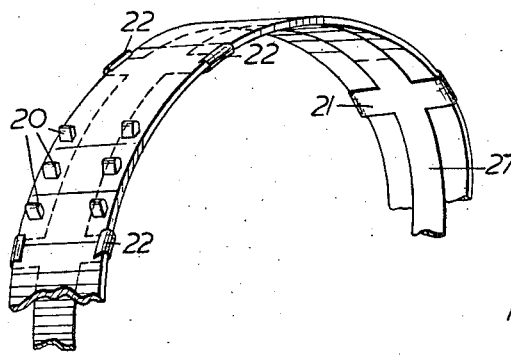
Fig. 8 is a perspective view of a portion of the part shown in Fig. 7.
Figure 9:
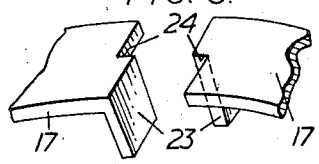
Fig. 9 represents a detail of the part shown in Fig. 8.

The strip 17 may be simply maintained curved by its hooking device 19 or else, as is better seen in Figs. 7 to 9, it may co-operate with a metallic support 21 of constant curvature. In this case, it suffices that the support 21, which may be of a lesser width than that of the strip 17, comprise hooks 22, gripping the latter at a certain distance apart. In this case, the end of the strip 17 is simply folded at 23 in the slit of the hub 18 and, preferably, as seen in Fig. 9, a shoulder 24 is provided at this end in order to maintain the transverse direction of the strip.

According to another application of this arrangement, the external end of a film may by its means be secured on a spool.

As it is seen in Fig. 10, a film 25, wound on a spool 1 and ending at 26 is hooked to a strip 27 provided, as in the embodiments described above, with projections 28 corresponding to the perforations 29 of the film, the strip 27 being provided at its end with clips 30 adapted to grip the edges of the cheeks of the spool and being provided eventually at 31 by a space on which may be inscribed the title of the film. This embodiment of the invention has therefore a double utility: on the one hand to secure the end of the film at the end of its winding and on the other hand to indicate the title of the film on the edge of the spool.

There exists at least two types of film, one comprising central perforations and the other lateral perforations. It is evident that the invention may be applied to these two types of film, as is seen on the Figs. 11 and 12 which show the hooking of a film 32 with central perforations 33 and that of a film 34 with lateral perforations 35, to devices for external fixation of the end of the film, comprising in both cases a strip 36 extended by a stem 37 at the end of which is a clip 38 intended to grip the edge of the cheeks of the spool. These clips 38 are represented with a certain curvature of their lateral edges 39 adapted to co-operate with the external tore or bead generally formed on the edge of the cheeks of the spools.

Figure 13:
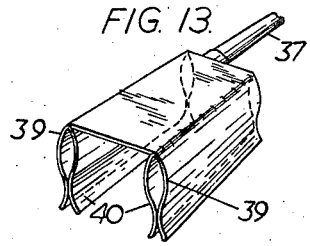
Fig. 13 represents a modification of a detail of the embodiment represented in Figs. 10 to 12.

In Fig. 13, a clip of the same type is represented, comprising, instead of a single curvature 39 on each side of the clip, a clip on each side, so that it constitutes a double clip, one clip for each cheek of the spool formed of two elements 39 and 40, provided with opposite directions, so as to be capable of gripping a cheek whether it were provided with a tore or bead on its edge or not.

The device of the present invention can be used to attach the free end of a perforated film to various desired elements. For instance, Figs. 1–3 show a modification of the device used to attach the film end to the core of a reel, Fig. 4 shows a modification used in attaching two film ends to each other, and various other applications are shown in Figs. 5–13.

In the above description, a number of embodiments of the invention have been described as examples of the numerous applications for which it may be used. These examples do not exhaust the possible uses to which the invention may be put while remaining within the scope of the statement of claims.

What I claim is:

1. A device for attaching one end of a cinematographic film to a reel having a hollow core provided with a slit comprising a strip of substantially non-resilient flexible material of substantially lesser width at the intermediate portion thereof than at the end portions thereof; a plurality of projections on said strip, near one end thereof, adapted to engage the perforations in an end portion of a film; and means on said strip, near the other end thereof, for detachably securing said other end of said strip to the core of a reel, said last-named means comprising a resilient portion of a thickness greater than the width of said slit and adapted to engage said slit.

2. A device for attaching a free end of a perforated film band to a desired element, comprising, in combination, an elongated strip of substantially non-resilient, flexible sheet material adapted to be connected to the desired element and having a free end portion; and a plurality of projections fixed to and extending from one face of said strip at said free end portion thereof for extending into the perforations of a film to connect the latter through said strip to a desired element.

3. A device for attaching a free end of a perforated film band to a desired element, comprising, in combination, an elongated strip of substantially non-resilient, flexible sheet material adapted to be connected to the desired element and having a free end portion; and at least one row of spaced projections longitudinally arranged on said strip fixed to and extending from one face of said strip at said free end portion thereof for extending into the perforations of a film to connect the latter through said strip to a desired element.

4. A device for attaching a free end of a perforated film band to a desired element, comprising, in combination, an elongated strip of substantially non-resilient, flexible sheet material adapted to be connected to the desired element and having a free end portion; and at least one row of spaced projections longitudinally arranged on said strip and integral therewith extending from one face of said strip at said free end portion thereof for extending into the perforations of a film to connect the latter through said strip to a desired element.

5. A device for attaching one end of a cinematographic film to a reel having a given radius and a core comprising a strip of substantially non-resilient flexible material having a length slightly greater than the radius of said reel; a plurality of projections fixed to and extending from one face of said strip, near one end thereof, adapted to engage the perforations in an end portion of a film; and means on said strip, near the other end thereof, for detachably securing said other end of said strip to the core of a reel.

6. A device for attaching a free end of a perforated film band to a desired element, comprising, in combination, an elongated strip of substantially non-resilient, flexible sheet material adapted to be connected to the desired element and having a free end portion; and a plurality of projections extending from one face of said strip at said free end portion thereof for extending into the perforations of a film to connect the latter through said strip to a desired element, said strip and said plurality of projections integrally molded from plastic material.

References Cited in the file of this patent

UNITED STATES PATENTS

| | | |
|---|---|---|
| 1,175,995 | Roncetti | Mar. 21, 1916 |
| 1,322,114 | Jenkins | Nov. 18, 1919 |
| 1,438,212 | Baluta | Dec. 12, 1922 |
| 1,672,214 | Hayden | June 5, 1928 |
| 1,847,945 | Hoskins et al. | Mar. 1, 1932 |
| 2,006,663 | Weis | July 2, 1935 |